United States Patent [19]

Isaka

[11] Patent Number: 5,549,088
[45] Date of Patent: Aug. 27, 1996

[54] INDUCTION SYSTEM FOR ENGINE

[75] Inventor: Yoshiharu Isaka, Iwata, Japan

[73] Assignee: Yamaha Hatsudoki Kabushiki Kaisha, Iwata, Japan

[21] Appl. No.: 182,798

[22] Filed: Jan. 14, 1994

Related U.S. Application Data

[63] Continuation-in-part of Ser. No. 834,604, Feb. 12, 1992, Pat. No. 5,359,972.

[30] Foreign Application Priority Data

| Feb. 21, 1991 | [JP] | Japan | 3-047436 |
| Apr. 8, 1991 | [JP] | Japan | 3-101789 |
| Apr. 15, 1991 | [JP] | Japan | 3-111182 |
| Jun. 28, 1991 | [JP] | Japan | 3-185400 |
| Aug. 5, 1991 | [JP] | Japan | 3-218015 |
| Aug. 30, 1991 | [JP] | Japan | 3-247018 |
| Jan. 14, 1993 | [JP] | Japan | 5-005199 |

[51] Int. Cl.$^6$ ............................................. F02B 31/00
[52] U.S. Cl. ............................. 123/308; 123/188.14
[58] Field of Search ............................. 123/306, 308, 123/432, 188.14

[56] References Cited

U.S. PATENT DOCUMENTS

| 4,317,438 | 3/1982 | Yagi et al. | 123/432 |
| 4,320,725 | 3/1982 | Rychlik et al. | 123/306 |
| 4,499,868 | 2/1985 | Kanda et al. | 123/306 |
| 4,617,896 | 10/1986 | Yoshikawa | 123/308 |
| 4,663,938 | 5/1987 | Colgate | 123/308 |
| 4,669,434 | 6/1987 | Okumura et al. | 123/308 |
| 4,719,886 | 1/1988 | Kotani et al. | 123/308 |
| 4,753,200 | 6/1988 | Kawamura et al. | 123/306 |
| 4,762,102 | 8/1988 | Kanda | 123/306 |
| 4,827,883 | 5/1989 | Khalighi et al. | 123/308 |
| 4,834,035 | 5/1989 | Shimada et al. | 123/308 |
| 4,974,566 | 12/1990 | LoRusso et al. | 123/308 |
| 4,998,518 | 3/1991 | Mitsumoto | 123/306 |

FOREIGN PATENT DOCUMENTS

| 0054964 | 12/1981 | European Pat. Off. . |
| 0068481 | 6/1982 | European Pat. Off. . |
| 0235288 | 8/1985 | European Pat. Off. . |
| A0500123 | 8/1992 | European Pat. Off. . |
| A3429414 | 8/1984 | Germany . |
| A3609693 | 10/1986 | Germany . |
| A3638021 | 11/1986 | Germany . |
| A4108469 | 9/1991 | Germany . |
| 51-54007 | 12/1976 | Japan . |
| 56-43428 | 4/1981 | Japan . |
| 56-139829 | 10/1981 | Japan . |
| 59-5767 | 2/1984 | Japan . |
| 60-11206 | 3/1985 | Japan . |
| 61-12940 | 1/1986 | Japan . |
| 61-144223 | 9/1986 | Japan . |
| 63-32122 | 2/1988 | Japan . |
| 63-73534 | 5/1988 | Japan . |
| 63-73532 | 5/1988 | Japan . |
| 2-115922 | 9/1990 | Japan . |
| 2-230920 | 9/1990 | Japan . |
| 2242226 | 9/1991 | United Kingdom . |

OTHER PUBLICATIONS

Patent Abstracts of Japan vol. 16, No. 399 (M–1300) 24 Aug. 1992 & JP–A–04 134 126 (Mazda Motor Corp) 8 May 1992.
Patent Abstracts of Japan vol. 10, No. 176 (M–491)(2232) 20 Jul. 1986 & JP–A–61 25 916 (Mazdo Motor Corp) 5 Feb. 1986 (abstract).

*Primary Examiner*—Erick R. Solis
*Attorney, Agent, or Firm*—Knobbe, Martens, Olson & Bear

[57] ABSTRACT

A number of embodiments of induction system for internal combustion engines employing multiple intake valves. The induction systems are designed so as to provide substantially unrestricted charging and axial flow into the cylinder bore when running under high-speed, high-load conditions. A control valve is provided which changes the effective configuration of the induction passages so as to provide a slant tumble action under lower speed and load conditions. Various arrangements are disclosed for altering the amount of slant action and providing slant actions in opposite or the same direction. In addition, a single control valve element is provided for achieving this effect in a three poppet valve per cylinder engine.

7 Claims, 12 Drawing Sheets

Figure 16

INDUCTION SYSTEM FOR ENGINE

CROSS-REFERENCE TO RELATED APPLICATION

This application is a continuation-in-part of my application entitled "Tumble Control Valve For Intake Port," Ser. No. 07/834,604, filed Feb. 12, 1992, and assigned to the assignee hereof, now U.S. Pat. No. 5,359.972.

BACKGROUND OF THE INVENTION

This invention relates to an induction system for an engine and more particularly to an improved induction system that improves the performance of the engine at low and mid-range conditions without deteriorating high-speed performance.

As is well known, the induction system of an internal combustion engine is extremely important in determining the performance of the engine. Also, with conventional induction systems, the induction system is designed so as to provide a compromise between the requirements of high-speed and low-speed performance. That is, to achieve maximum high-speed performance, the induction system should be designed so as to permit maximum charging of the cylinder. This can be achieved by providing relatively large unrestricted flow passages and in which the intake charge enters the cylinder in a direction so as to flow generally parallel to the axis of the cylinder bore.

Although the described type of induction system provides high power outputs, the unobstructed flow and large flow areas tend to reduce the flow velocity entering the cylinder when the engine is operated at low and mid-range speeds. Under these conditions, it is desirable to have the flow velocity entering the chamber to be more rapid and also to introduce some turbulence so as to improve the flame propagation and combustion. However, these turbulence increasing devices can significantly reduce the breathing ability of the engine and its high-speed performance.

Therefore, conventional induction systems provide a compromise between these two extremes with an emphasis on the condition which is more frequently encountered.

There have been proposed, however, a number of devices for cooperation with the induction system so that it can accommodate more readily the requirements of the engine at both high and low speeds as well as providing proper conditions during mid-range performance. For example, in my aforenoted copending application entitled "Tumble Control Valve for Intake Port," Ser. No. 07/834,604, filed Feb. 12, 1992, and assigned to the assignee hereof, there is disclosed an arrangement for a multiple valve engine which includes a control valve that is movable between an unrestricted position so as to provide maximum engine charging and a flow redirecting position wherein different types of flow patterns and different turbulence inducing arrangements may be accomplished in the engine. That system is extremely effective in improving the engine performance.

In the various embodiments shown in that application, there are constructions which are designed so as to provide, in addition to normal, unrestricted charging, either tumble, swirl, or a combination of tumble and swirl. Tumble is a type of swirling motion that occurs in the combustion chamber about an axis that extends transversely to the cylinder bore axis. With this type of motion, the intake charge is introduced from one side of the cylinder bore and flows across to the other side to be redirected in a downward direction where it will strike the head of the piston and then flow back to the side where it is entered so as to accomplish this tumble motion. Swirl, on the other hand, is a rotary motion within the cylinder bore that occurs about the cylinder bore axis. Under some conditions, tumble is preferred and under other conditions, swirl is preferred.

It has been discovered that with some engines and in some running conditions, a still further type of action in the cylinder may be desirable. This is a motion which may be referred to as "slant tumble". With slant tumble, there is superimposed upon the normal tumble action a slight action that tends to cause the charge to flow at an angle to a plane containing the axis of the cylinder bore but one which is not strong enough to be considered swirl. This type of motion is particularly advantageous if the charge to the engine is introduced through the induction system in a somewhat nonhomogeneous fashion because the slant tumble action will promote mixing and improve mixture distribution in the combustion chamber as can be desired.

It is, therefore, a principal object of this invention to provide an improved induction system for an internal combustion engine.

It is a further object of this invention to provide an improved induction system for an internal combustion engine that permits unobstructed charging of the cylinder under high-speed high-load conditions and which will permit the generation of a slant tumble action under other running conditions.

It is a further object of this invention to provide an improved control valve and induction system arrangement that can provide the desired flow patterns under all running conditions.

As has been noted, in order to achieve high power outputs it is desirable to provide an induction system that can fully charge the combustion chamber. This is generally done by providing large, intake valves or, in some instances, multiple intake valves. For example, engines having two intake valves per cylinder are particularly useful in improving charging efficiency under high-speed high-load conditions.

With induction systems that employ plural intake valves and intake valve seats, there may be instances wherein the intake valves are disposed at different distances from a plane containing the axis of the cylinder bore. This situation commonly occurs with engines employing three intake valves per cylinder that comprise a center valve that is farther from the plane containing the cylinder bore axis and a pair of side intake valves that are disposed closer to and may actually intersect this plane. Obviously, the induction systems that supply these valves are disposed so that they have different flow paths because of the different locations of the valve seats which they serve. Thus, in order to control the flow through the induction passages so as to obtain the desired flow pattern, the valve arrangement for controlling the flow through the induction systems can become complicated.

It is, therefore, a further object of this invention to provide an improved induction system and control valve for a multiple valve engine.

It is a further object of this invention to provide an improved induction system for a multiple valve engine embodying a single control valve for controlling the flow through the induction system before it reaches each of the valve ports.

It is a still further object of this invention to provide an improved tumble control valve arrangement for a multiple valve engine wherein a single control valve can control the tumble action through all of the intake ports.

SUMMARY OF THE INVENTION

A first feature of this invention is adapted to be embodied in an induction system for an internal combustion engine having a cylinder bore defining in part a combustion chamber. Induction passage means are provided for delivering a charge to the combustion chamber. The induction passage means is configured so that the charge introduced thereby into the combustion chamber is generally unrestricted and flows in a generally axial direction into the cylinder bore. Control valve means are provided in the induction passage means and are movable between a first position wherein the flow of a charge into the combustion chamber is generally unrestricted and in a generally axial direction and a second position to redirect the flow into the combustion chamber in a direction to generate a slant tumble flow to the charge flowing in a tumble motion about an axis transverse to the axis of the cylinder bore and at an angle to a plane containing the cylinder bore axis without generating swirl.

Another feature of the invention is adapted to be embodied in an induction system for an internal combustion engine comprised of a cylinder block having a cylinder bore, a piston reciprocating in the cylinder bore and a cylinder head affixed to the cylinder block enclosing the cylinder bore to define with the piston and cylinder bore a combustion chamber. At least three intake valve seats are formed in the cylinder head and form three intake ports serving the combustion chamber. Popper valves are associated with the intake valve seats and are supported for reciprocation by the cylinder head for opening and closing the intake ports. Induction passage means terminate at the intake ports for supplying an induction charge to the combustion chamber. The induction passage means and intake ports are configured so as to provide a generally unrestricted flow of an intake charge into the combustion chamber in a generally axial direction. A single control valve is supported within the cylinder head and intersects the induction passage means. This control valve is movable between a first position wherein the flow into the combustion chamber is substantially unrestricted and a second position wherein the flow into the combustion chamber is redirected so as to create a tumble action.

DETAILED DESCRIPTION OF THE PREFERRED EMBODIMENTS OF THE INVENTION

Figure 1:
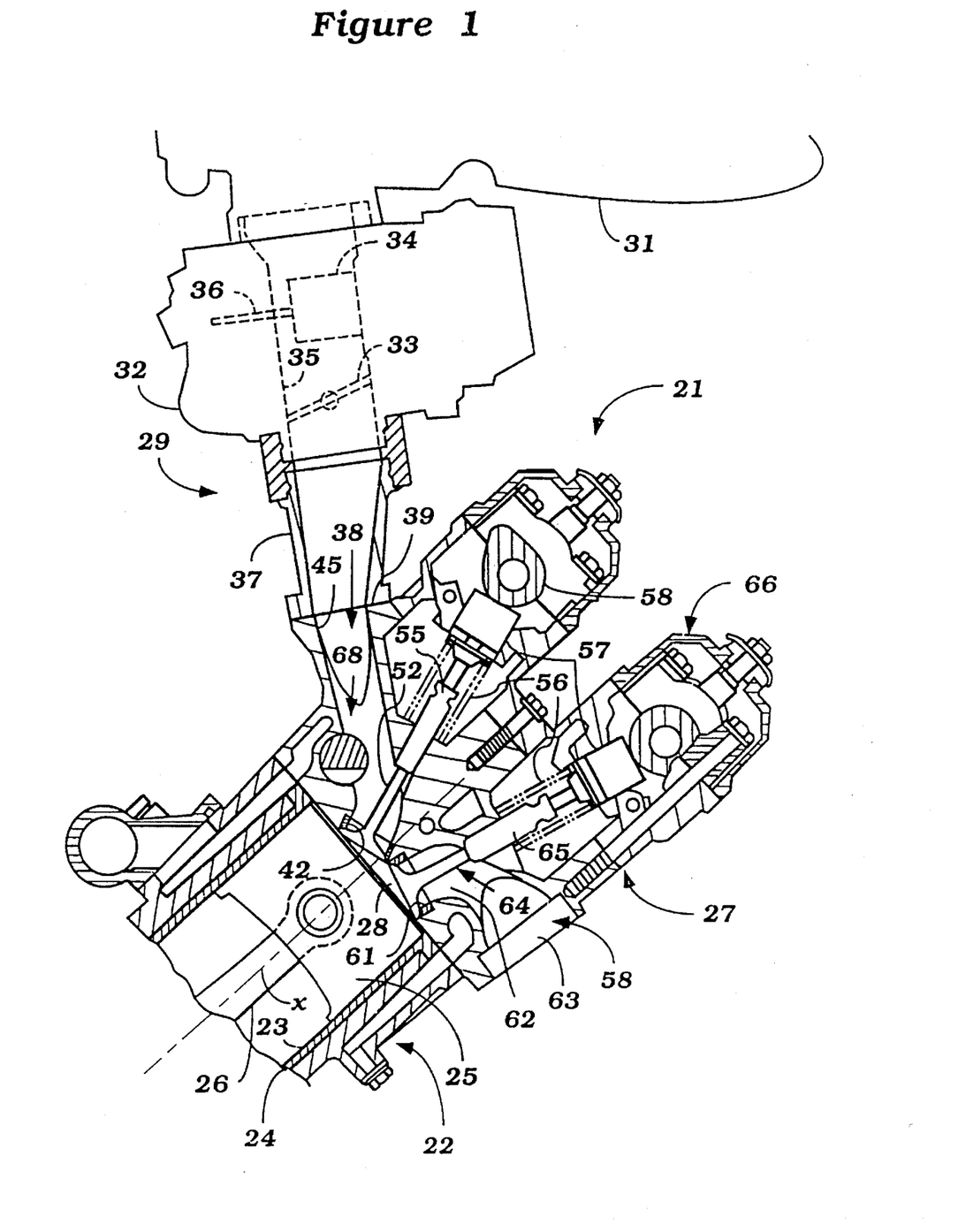
FIG. 1 is a cross-sectional view taken through a portion of an internal combustion engine constructed in accordance with a first embodiment of the invention.

Referring now in detail to the drawings and initially to the embodiment of FIGS. 1–7 and primarily initially to FIG. 1, an internal combustion engine constructed in accordance with this embodiment of the invention is identified generally by the reference numeral 21. Since the invention deals primarily with the induction system for the engine, only the upper portion of the engine 21 has been depicted and will be described. Where any details of the engine 21 are not described, they may be considered to be conventional. Also, for the most part, the invention is described in conjunction with only a single cylinder of the engine, although other cylinders appear in certain of the figures. It should be readily apparent to those skilled in the art that the invention may be practiced in conjunction with either single cylinder engines or multiple cylinder engines and multiple cylinder engines having various configurations.

The engine 21 is comprised of a cylinder block 22 that has one or more cylinder bores 23 formed therein by pressed or cast-in cylinder liners 24. Obviously, the invention may be employed in conjunction with engines wherein the cylinder bores are formed directly by the cylinder block 22. The axis of the cylinder bore 23 is designated in certain of the figures by the line X.

Pistons 25 are supported for reciprocation within the cylinder bores 23 and are connected by means of connecting rods 26 to a crank shaft (not shown) in a conventional manner.

A cylinder head assembly, indicated generally by the reference numeral 27 is affixed to the cylinder block 22 in a known manner and closes the cylinder bores 23. The cylinder head 27 is provided with recesses 28 which cooperate with the heads of the pistons 25 and the cylinder bores 23 to form variable volume chambers of the engine, which may be considered to be the combustion chambers.

The engine 21 in all embodiments described is of the cross-flow pattern and therefore one side of the cylinder head, lying substantially on one side of a plane $L_x$ (FIG. 7) containing the axis X of the cylinder bore and passing through the rotational axis of the crankshaft is comprised of the intake side and this includes an induction system, indicated generally by the reference numeral 29. The opposite side comprises the exhaust side of the engine and contains the exhaust system, which will be described.

The induction system 29 includes an arrangement for drawing atmospheric air and delivering it to the combustion chamber. This includes an air inlet device, shown partially and identified by the reference numeral 31 which draws atmospheric air and which may silence and filter this air. The air is then delivered, in the embodiments described, to a charge former in the form of a carburetor 32. Although the invention is described in conjunction with carbureted engines, it should be readily apparent to those skilled in the art that the invention may be employed in conjunction with other charge forming systems including fuel injection which may be of either the manifold or direct cylinder type.

In the illustrated embodiment, the carburetors 32 are of the so-called air valve type and include manually operated throttle valves 31 which are operated under operator control in any well known manner. In addition, a sliding piston 34 is supported in the induction passage 35 of the carburetor 32 and has a metering rod 36 for controlling the fuel flow. The piston 34 also moves automatically in position in the induction passage 35 so as to maintain a substantially constant pressure differential for the flow through the carburetor 32.

The carburetor 32 supplies the air fuel mixture to an intake manifold 37 which is affixed in a suitable manner to the cylinder head assembly 27 and which communicates with intake passages 38 formed in of the cylinder head assembly 27 beginning at an exterior surface 39.

Figure 2:
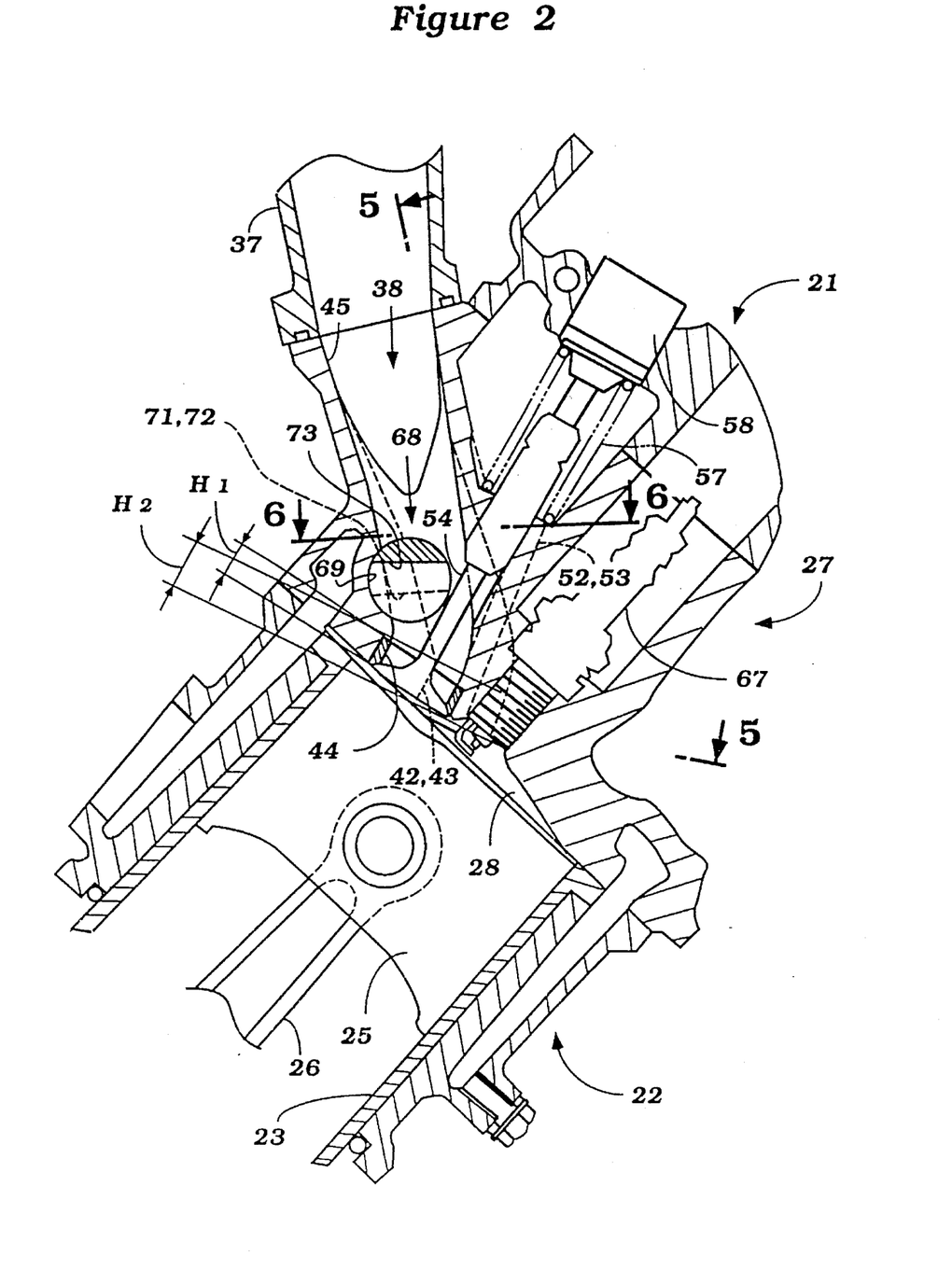
FIG. 2 is an enlarged view of the area shown in FIG. 1 but is taken along a slightly different plane from that of FIG. 1.
Figure 5:
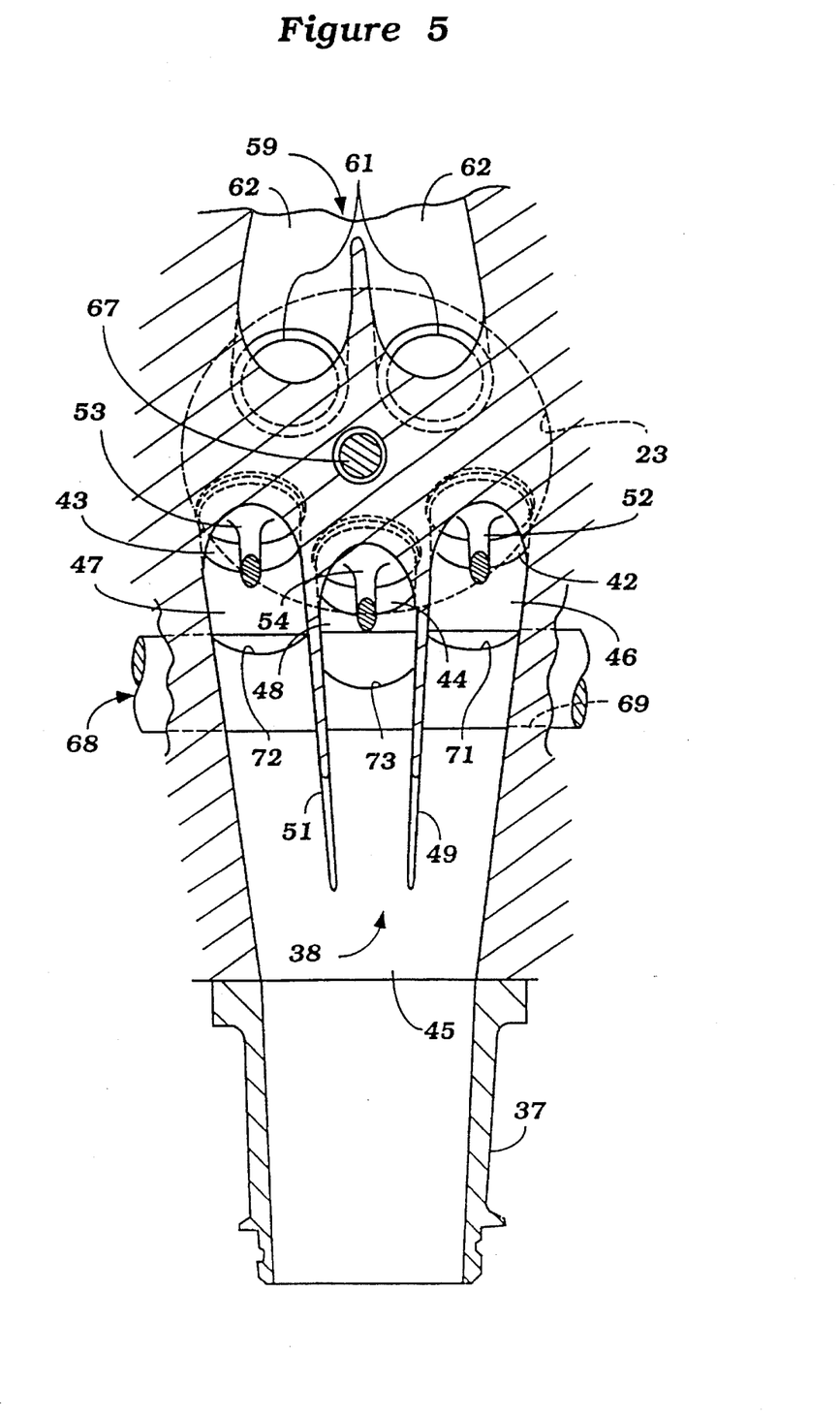
FIG. 5 is a cross-sectional view taken along the line 5—5 of FIG. 2.
Figure 6:
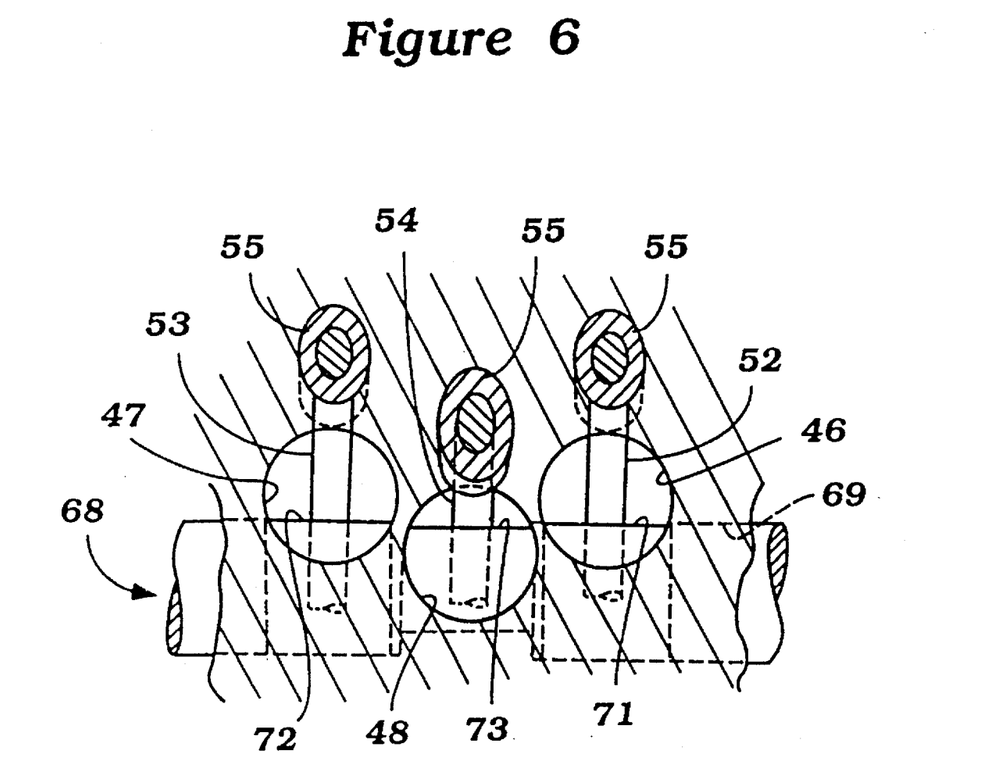
FIG. 6 is a cross-sectional view taken along the line 6—6 of FIG. 2.

These induction passages may be best understood by reference to FIG. 5 which is a cross-sectional view taken along the line 5—5 of FIG. 2 and which shows the configuration and orientation of the induction passage 38 in more detail. In the illustrated embodiments, the induction passage 38 is of the siamese type and serves three intake ports formed by three intake valve seats comprised of a pair of side intake valve seats 42 and 43 and a center intake valve seat 44. The relation of these valve seats may be best seen in FIG. 7 which is an underside view of the cylinder head assembly 27 it will be seen that the centers of the intake ports defined by the side intake valve seats 42 and 43 lie on a common line $L_1$ that extends parallel to the plane $L_x$ containing the cylinder bore axes X and the axis of rotation of the crankshaft. The intake valve port formed by the center intake valve seat 44 lies on a line $L_2$ which is spaced further from the plane $L_x$ as clearly shown in FIG. 7. The orientation of the valve seats 42, 43, and 44 and the valves which are associated with them will be described in more detail later.

As has been noted, the intake passage 38 is of the siamese type in this embodiment and it includes an inlet opening 45 which is formed in the outer surface 39 of the cylinder head assembly 27, as previously noted. This passage is then divided into three intake passages comprised of a pair of side intake passages 46 and 47 and a center intake passage 48 which intake passages are formed by internal walls 49 and 51 of the cylinder head assembly 27. It is to be understood that although the invention is described in conjunction with a siamese type of intake passage, the invention may be employed with induction systems wherein each intake valve seat 42, 43, and 44 is provided with its own intake passage or any pairs of the intake passages may be siamesed with each other.

Side intake valves 52 and 53 and a center intake valve 54 are supported for reciprocation in the cylinder head assembly 27 by having their stems slidably supported in respective valve guides 55. These valve guides 55 may be pressed or otherwise fixed in the cylinder head assembly 27. These intake valves 52, 53, and 54 are disposed so that the side intake valves 52 and 53 rotate preferably about axes that lie in a common plane and which is disposed at an acute angle $\theta_1$ to the plane $L_x$ containing the cylinder bore axis X. The center intake valve 54 is disposed so that its axis is disposed at an acute angle $\theta_2$ to the plane $L_x$ but that this acute angle $\theta_2$ is less than the acute angle $\theta_1$ of the planes containing the axes of the side poppet valves 52 and 53. It is to be understood that this is a preferred form of the valve placement but that other valve placements may be employed without departing from the spirit and scope of the invention.

The intake valves 52, 53, and 54 may be disposed so that their reciprocal axes intersect at a common point although, again, this is not a necessary ingredient of the invention. The intake valves 52, 53, and 54 are all urged to their closed positions by means of coil compression springs 56 that are loaded between the cylinder head 27 and keeper retainer assemblies, as is well known in this art. Thimble tappets 57 are slidably supported in the cylinder head assembly 27 and are operated by an intake cam shaft 58 for opening and closing the intake valves 52, 53, and 54 in a well known manner. The intake cam shaft 58 is driven at one-half crankshaft speed by any suitable drive, as is also well known in this art.

Referring now to the exhaust side of the engine, the cylinder head 27 is provided with siamesed exhaust passages 59 which communicate with exhaust ports formed by valve seats 61 formed in the cylinder head 27 in an appropriate manner. In this embodiment, there are two exhaust ports formed by the valve seat 61 and these exhaust ports are disposed so that their centers lie on a plane $L_3$ (FIG. 7) that is disposed on the opposite side of the plane $L_x$ containing the cylinder bore axes X from the intake valves, as already noted.

There are provided a pair of exhaust passages 62 that extend from the valve seat 61 to a common discharge opening 63 that is formed in the exhaust side of the cylinder head 27. Any suitable exhaust manifold may be provided for collecting the exhaust gases and discharging them to the atmosphere through any well known manner.

Exhaust valves 64 are slidably supported within the cylinder head assembly 27 in valve guide 65 that are pressed or otherwise fixed to the cylinder head 27 and cooperate with the valve seat 61 so as to control the flow through the exhaust passage 58.

Like the intake valves, the exhaust valves 64 are urged to their closed position by coil compression springs 56 and thimble tappets 57 are associated with the stems of each of the exhaust valves 64 for controlling their opening and closing. An overhead mounted exhaust cam shaft 66 which is driven at half crankshaft speed like the intake cam shaft 58 is journaled in the cylinder head assembly 27 and operates the thimble tappets 58 for operating the exhaust valve 64 in a well known manner.

Spark plugs 67 are mounted in the cylinder head assembly 27 so that their spark gaps lie substantially on the cylinder bore axis X. The spark plugs 67 are fired by any suitable ignition circuit.

The reciprocal axes for the exhaust valves 64 lie in a common plane and this common plane is disposed at an acute angle to the plane $L_x$ containing the axes X of the cylinder bore. This acute angle is between the acute angle $\theta_2$ of the center intake valve 44 and those $\theta_2$ of the side intake valves 42 and 43. Also, it would be noted that the center of the exhaust valve seats 61 or exhaust ports is disposed at a distance $D_3$ from the plane $L_x$ which is less than the distance $D_1$ of the plane $L_1$ of the side intake valves and less than the distance $D_2$ of the plane $L_2$ containing the center intake valve 44. Again, this relationship is deemed to be only a preferred arrangement and the invention can be employed with engines having other placements.

As should be readily apparent from the foregoing description and particularly from an inspection of FIGS. 1, 2, 3, and 4, the intake passages 46, 47, and 48 are disposed so that they discharge into the combustion chamber and specifically the cylinder head recess 28 in a direction generally parallel to the cylinder bore axis X and in a generally unrestricted manner. Each of the intake passages 46, 47, and 48 is comprised of a generally straight portion which is disposed at an angle to the plane $L_x$ and a generally straight portion having a height H which extends generally parallel to the cylinder bore axes X so as to provide substantially unrestricted flow. This construction, as noted above, however, tends to provide low turbulence in the combustion chamber under low and mid-range speeds and hence combustion may be slow and incomplete. In order to avoid this problem and to provide the desired type of flow pattern under other running conditions and maximum speed and maximum load, a control valve assembly, indicated generally by the reference numeral 68 is provided in the induction passages 46, 47, and 48 for redirecting the flow through them as will now be described.

The control valve assembly 68 is comprised of a generally cylindrical member that is rotatably journaled in the cylinder head assembly 27 within a bore 69 that extends substantially parallel to the plane $L_x$ and which intersects each of the intake passages 46, 47, and 48 at a point slightly above their bight in the illustrated embodiments. Because of this location, the control valve 68 will protrude further into the center intake passage 48 than it does into the side intake passages 46 and 47 as clearly shown in FIGS. 3 and 4. This has both structural and functional advantages in that it permits a single control valve 68 to be used for all of the intake passages 46, 47, and 48 for a given cylinder bore 23 and also assists in providing the desired flow pattern when the control valve 68 is rotated to change the flow pattern. This is possible even though the intake passages 46 and 47 have a different orientation than the intake passage 48 as clearly shown in FIG. 2.

The control valve 68 is provided with cutout portions 71 and 72 in the intake passages 46 and 47, respectively, and a cutout 73 in the intake passage 48. In this embodiment, the cutouts 71 and 72 remove a lesser portion of the control valve 68 than the cutout 73 as clearly shown in FIGS. 3 and 4. The cutouts 71, 72, and 73 are configured so that when the control valve 68 is in a first wide open or full load running condition that there is absolutely no extension of the control valve 68 into the induction passages 46, 47, and 48, as noted in my aforenoted copending applications. Hence, unrestricted flow to the combustion chambers is possible in this position and good charging efficiency can be obtained. Also, no turbulence will be created in the combustion chambers under this condition.

When the control valve 68 is rotated to its second position, shown in the figures, the body of the valve will pass into and obstruct the intake passages 46, 47, and 48. The obstruction of the flow passages 46 and 47 causes the air flow to be directed into the combustion chamber as shown by the arrows A in FIG. 4 toward one side of the valve seats 42 and 43 and toward the opposite side of the cylinder bore 23 so as to generate a swirling action about an axis that extends transversely to the cylinder bore axis X so as to generate a tumble action. The magnitude of this tumble action will be determined by the height $H_1$ of the straight portion of the induction passages 46 and 47 with the shorter the height the more tumble action which will be generated. This is because of the fact that the shorter the height $H_1$ the more effective the inclination of the remainder of the induction passages 46 and 47 in the straight passages will be significant.

Figures 3, 4:
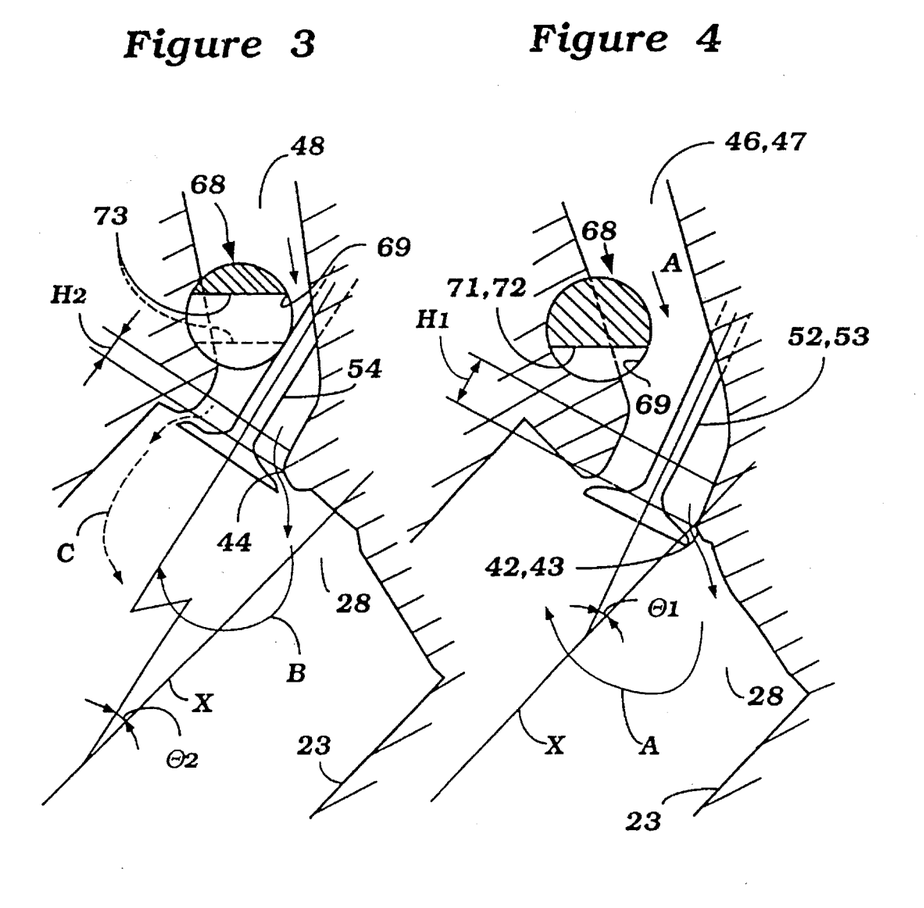
FIG. 3 is a cross-sectional view taken along the same plane as FIG. 2 and shows the air flow into the combustion chamber when the control valve is in its second position through the center intake port.
FIG. 4 is an enlarged cross-sectional view taken along the same plane as FIG. 1 and shows the flow entering the combustion chamber through the side intake ports.

Referring now to FIG. 3, there is also generated a tumble action as indicated by the arrow B in this figure by the presence of the control valve 68 in occluding fashion to the intake passage 48. However, since the cutout is deeper in this embodiment, some flow can pass on the opposite side of the valve seat 44 as shown by the broken line arrow C so as to reduce the effect of the tumble action. In addition, the valve seat 44 is disposed at a greater distance $D_2$ from the plane $L_x$ the distance $D_1$ of the side intake valves 42 and 43 so that the tumble action will not be as great. To compensate for this, the height $H_2$ of the straight section of the intake passage 48 is made shorter than the height $H_1$ of the intake passages 46 and 47 so as to reduce the differences between the tumble flow from the center intake passage 48 from those of the side intake passages 46 and 47.

Figure 7:
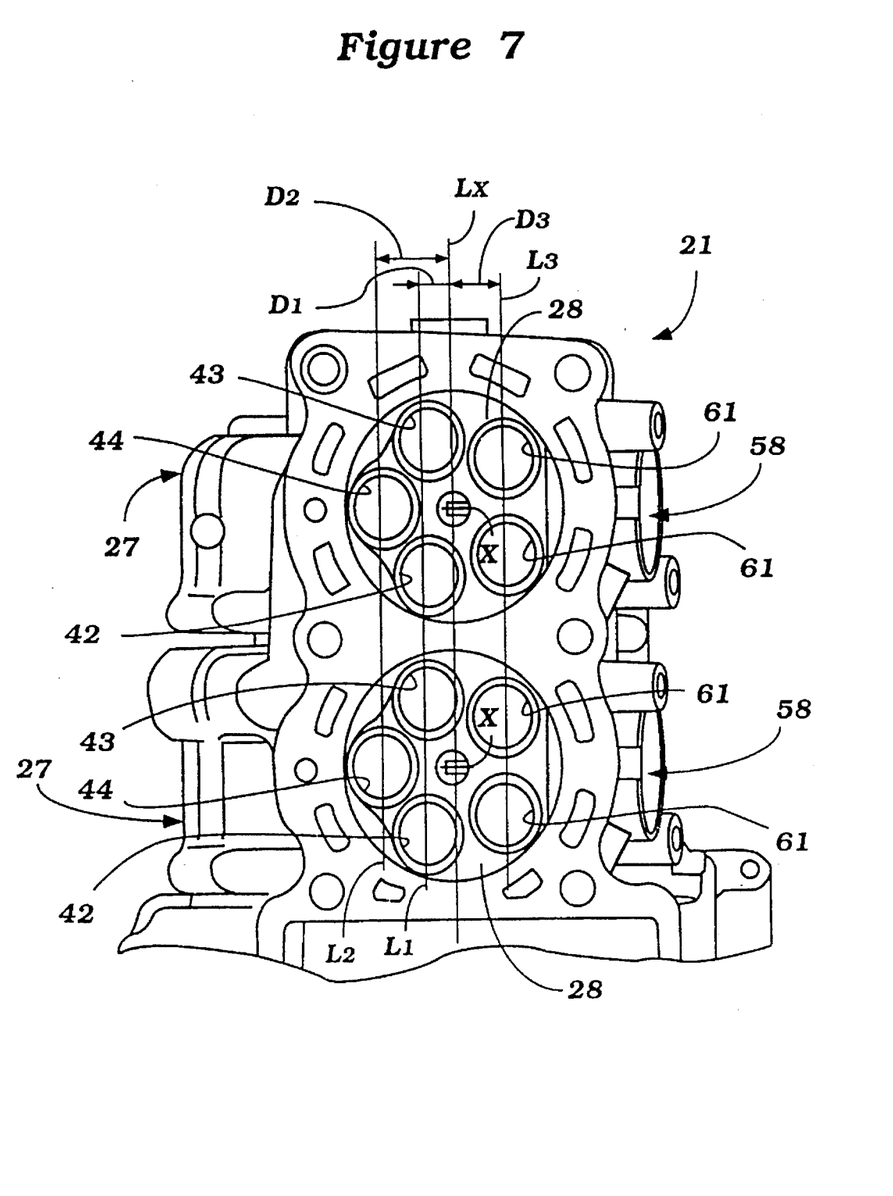
FIG. 7 is a bottom plan view of the cylinder head of this embodiment.

Since, as shown in FIGS. 5 and 7, the intake ports 42 and 43 are disposed at the sides of the bore while that of the intake passage 44 is disposed more at the center, there will be generated in addition to the tumble action, some action tending to cause rotation of the flow from the side intake passage ports 42 and 43 toward the center since there will be less strength in the tumble action from the center intake passage 44. As a result, there will be some twisting or slanting to the tumble action to cause two tumbling flows to turn toward the center. However, this is not enough turning action so as to generate swirl. As a result of this action, it is possible to ensure good mixing and turbulence in the combustion chamber without causing excess turbulence that could cause adverse running conditions and performance.

It should be noted that the control valve 68 may be operated by any suitable mechanism, as described in my aforenoted pending application, and that any kind of a control strategy may be employed. Basically, under low-speed, low-load conditions, the control valve 68 is placed in its second position as shown in the solid line views of the figures and then as the engine's speed and load increases, the control valves 68 are rotated in a step function toward their open position so as to reduce the turbulence and increase the charging efficiency.

In the construction as thus far described, the control valve 68 has been rotated in a clockwise direction from its closed position to its open position. However, it is also possible to effect the rotation in the opposite direction and in this case the occluding portion of the control valve 68 in the center intake passage 48 will be closer to the valve seat as shown by the broken line view of FIG. 3. This will tend to increase the amount of tumble generated by the center intake valve since the airflow path C counter to the tumble action will be substantially reduced.

It should be readily apparent from the foregoing description that the amount of slant to the tumble direction can be controlled by changing certain parameters such as the heights $H_1$ and $H_2$ of the straight sections of the intake passages 46, 47, and 48. Also, the amount of cutouts for the respective portions 71, 72, and 73 and the direction of rotation of the control valve 48 can effect this feature.

Figure 8:
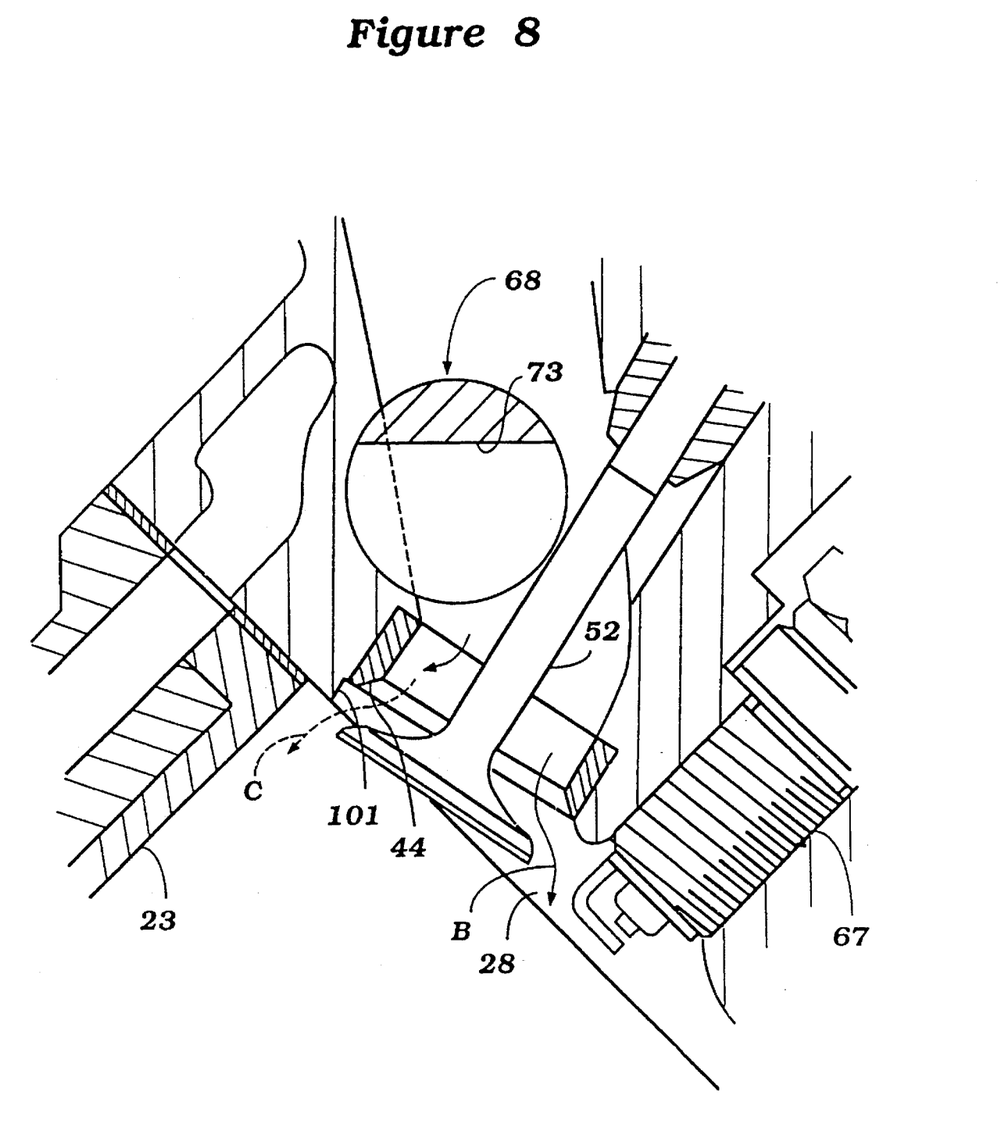
FIG. 8 is an enlarged cross-sectional view, in part similar to FIG. 3, and shows an embodiment of how the flow pattern can be redirected or controlled.

Now will be described some other constructions which can be employed so as to vary the amount of tumble action by the respective valves and valve ports the first of which appears in FIG. 8 and is related to the center intake passage 48 and its valve seat 44. Because of the similarity, components which are the same have been identified by the same reference numerals and they will not be described again except insofar as is necessary to understand the construction and operation of this embodiment.

This embodiment shows a way in which the counter-tumble flow C associated with the center intake valve seat 42 can be reduced. This is done by providing a slight recessing of the valve seat 42 so as to provide a generally cylindrical masking portion 101 which will tend to restrict the counter-tumble flow C. This concept may be used with any of the valve seats depending upon the flow pattern which is desired.

Figure 9:
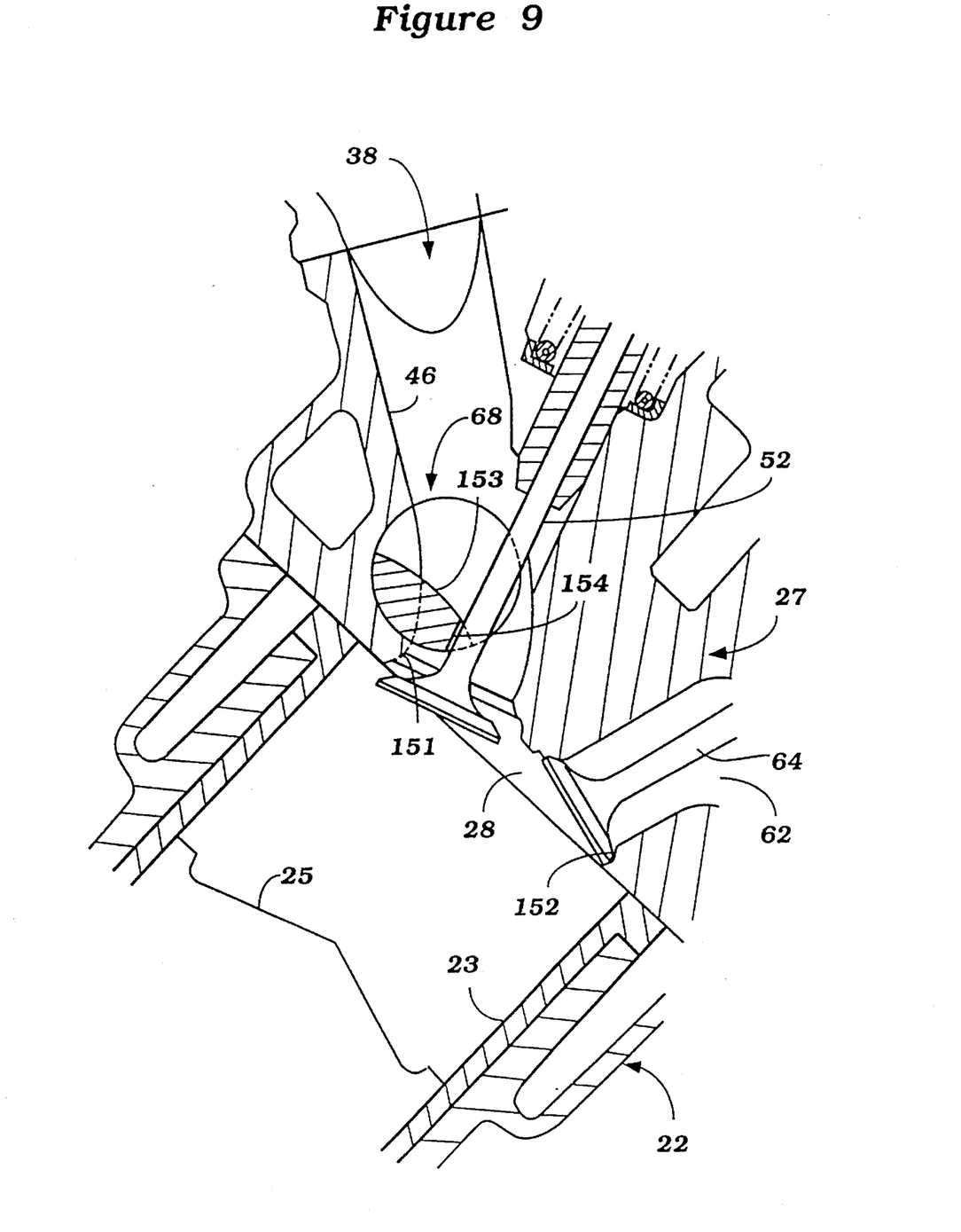
FIG. 9 is an enlarged cross-sectional view, in part similar to FIG. 4, and shows another embodiment of the invention.

FIG. 9 shows another embodiment wherein the control valve 68 is positioned somewhat differently and is shaped differently so as to increase the swirl action. This can be utilized with either the center intake valve seat 44 or one of the side intake valve seats 42 or 43. In addition, this construction eliminates the separate pressed in valve seat but rather provides a coating or other type of surface finish 151 for shortening the straight section of the intake passage without adversely effecting its flow capabilities when running at high-speed and high-load. Similar treatments 152 may be provided for the valve seats of the exhaust valves 64.

This permits the control valve 68 to be positioned lower and in the bight associated with the respective intake passage, this particular embodiment being depicted in conjunction with one of the side intake passages 46 or 47. The cutout portion, indicated generally by the reference numeral 153 is formed somewhat in an arcuate fashion so as to provide a continuation of the surface defining the intake passage 46 when the control valve is in its first or fully opened non-flow restricting position. In addition, the side surface of the control valve 68 is provided with a further notch or recess 154 so as to permit it to clear the stem of the respective intake valve 52 and direct substantially all of the flow in the tumble path.

Figure 10:
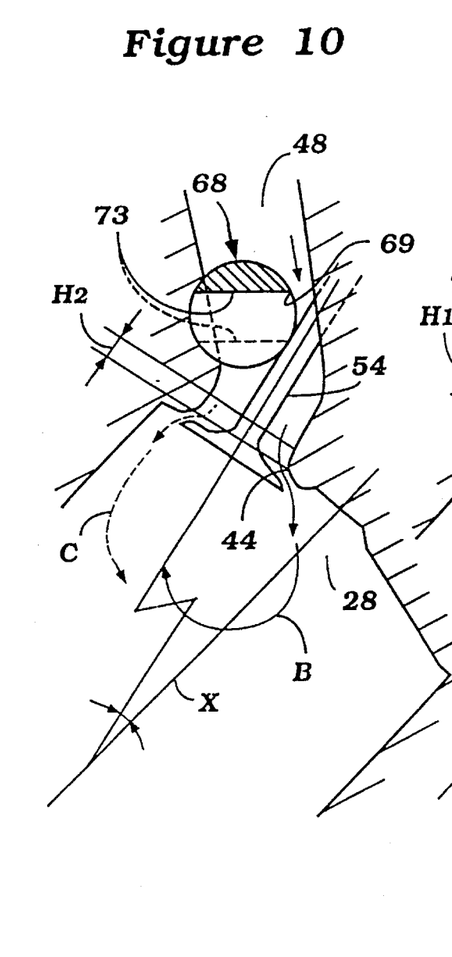
FIG. 10 is a cross-sectional view, in part similar to FIGS. 3 and 8 and shows another embodiment of the invention.
Figure 11:
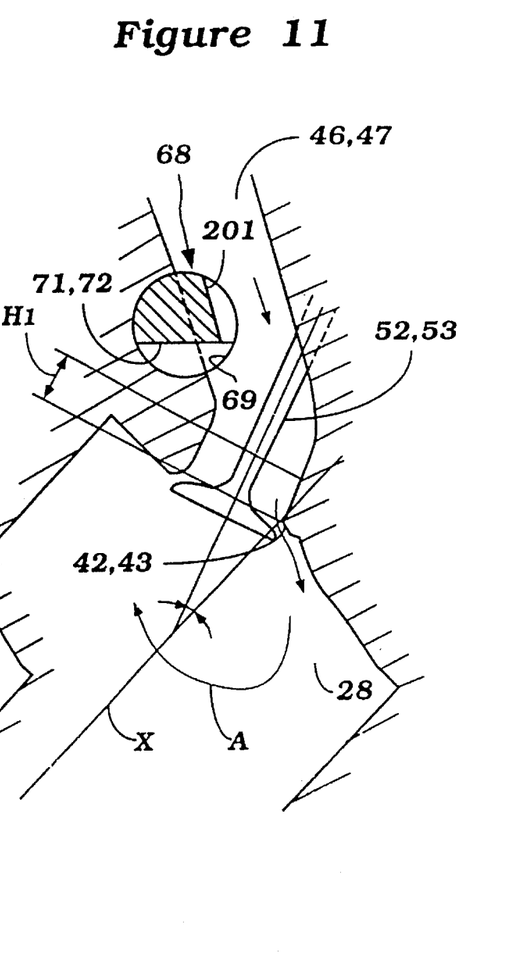
FIG. 11 is a cross-sectional view, in part similar to FIGS. 4 and 9 and shows another embodiment of the invention.

FIGS. 10 and 11 are views similar to FIGS. 3 and 4, respectively, but these figures show how the amount of tumble action from the center intake passage 48 may be increased and the amount of tumble action from either or both of the side intake passages 46 and 47 may be reduced. This variation in tumble action between the side intake passages 46 and 47 and the center intake passage 48 will effect the amount of slant to the tumble action, as should be apparent. Because these embodiments differ from the previously described embodiments only in certain dimensional relationships and another structural distinction, which will be described, the reference numerals applied to the previous embodiment are utilized here.

In this embodiment, the height $H_1$ of the straight portion of the side intake passages 46 and 47 is increased over the height $H_2$ of the straight section of the center intake passage 48. That will, in effect, increase the amount of tumble from the center intake passage 48 and reduce the amount of tumble from the side intake passages 46 and 47. Thus, with the arrangements previously described this will reduce the amount of slant to the tumble action.

Like the previously described embodiment, the control valve may be rotated in a counterclockwise direction from its first position to its second position as shown in the dotted line view of FIG. 10 so as to reduce the amount of counter-tumble flow C and increase the amount of tumble flow B. The amount of tumble action can also be varied and in fact reduced by providing a relief, indicated at 201 in FIG. 11 in the control valve 68 so as to reduce the amount of flow redirection toward the cylinder bore axis X.

Figure 12:
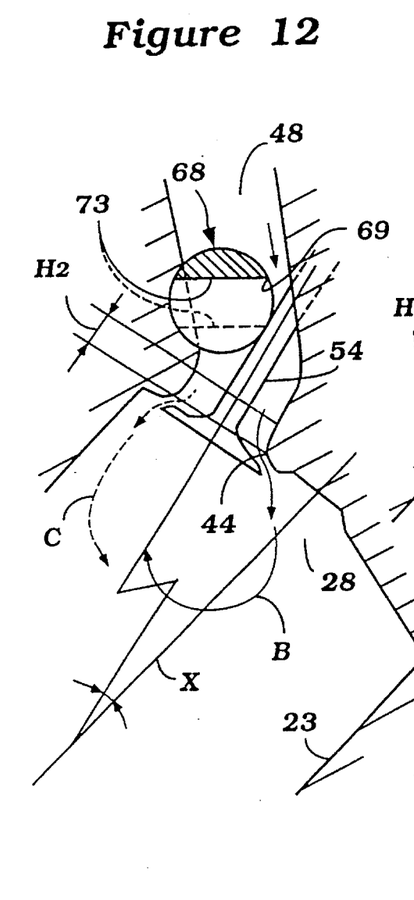
FIG. 12 is a cross-sectional view, in part similar to FIGS. 3, 8, and 10 and shows yet another embodiment of the invention.
Figure 13:
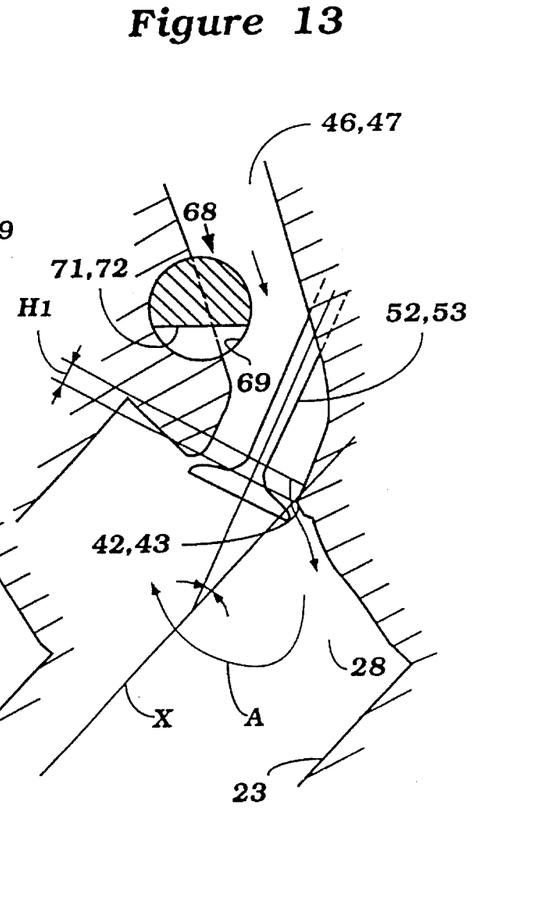
FIG. 13 is a cross-sectional view, in part similar to FIGS. 4, 9, and 11, and shows yet another embodiment of the invention.

FIGS. 12 and 13 show other embodiments which may be used with either the center or side intake passages 48, 46 and 47 and is generally similar to the embodiment of FIGS. 10 and 11. In this embodiment, the side intake passages 46 and 47 have a lesser height $H_1$ than the height $H_2$ of the straight section of the center intake passage 48 so as to promote more tumble from the side intake passages 46 and 47 than the center intake passage 48. In addition, in this embodiment, the cutout 201 is not employed so as to promote more tumble action for the side intake passages 46 and 47.

Figures 14, 15:
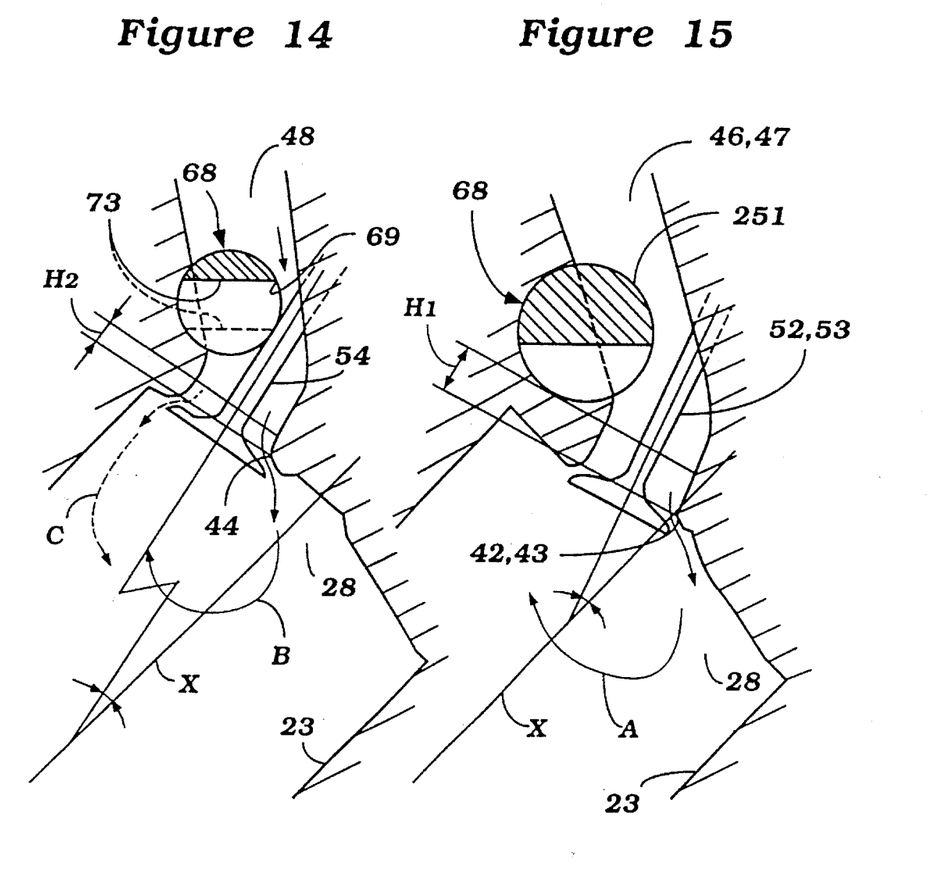
FIG. 14 is a cross-sectional view, in part similar to FIGS. 3, 8, 10, and 12 and shows a still further embodiment of the invention.
FIG. 15 is a cross-sectional view, in part similar to FIGS. 4, 9, 11, and 13, and shows yet another embodiment of the invention.

FIGS. 14 and 15 show additional embodiments like those of FIGS. 3, 4, and 8–13 in that they depict other ways in which the amount of tumble action can be varied so as to provide the desired amount of slant to the overall tumble action in the cylinder bore. In these embodiments the height $H_1$ of the straight portion of the side intake passages 46 and 47 is greater than the height $H_2$ of the center intake passage 48 so as to increase the tumble action from the center intake passage 48 without significantly decreasing the tumble action from the side intake passages 46 and 47. This decreased tumble action is offset by employing a larger diameter section, 251 for the portion of the control valve 68 that goes through the side intake passages 46 and 47 so as to divert more flow toward the one side of the valve seats 42 and 43.

Figure 16:
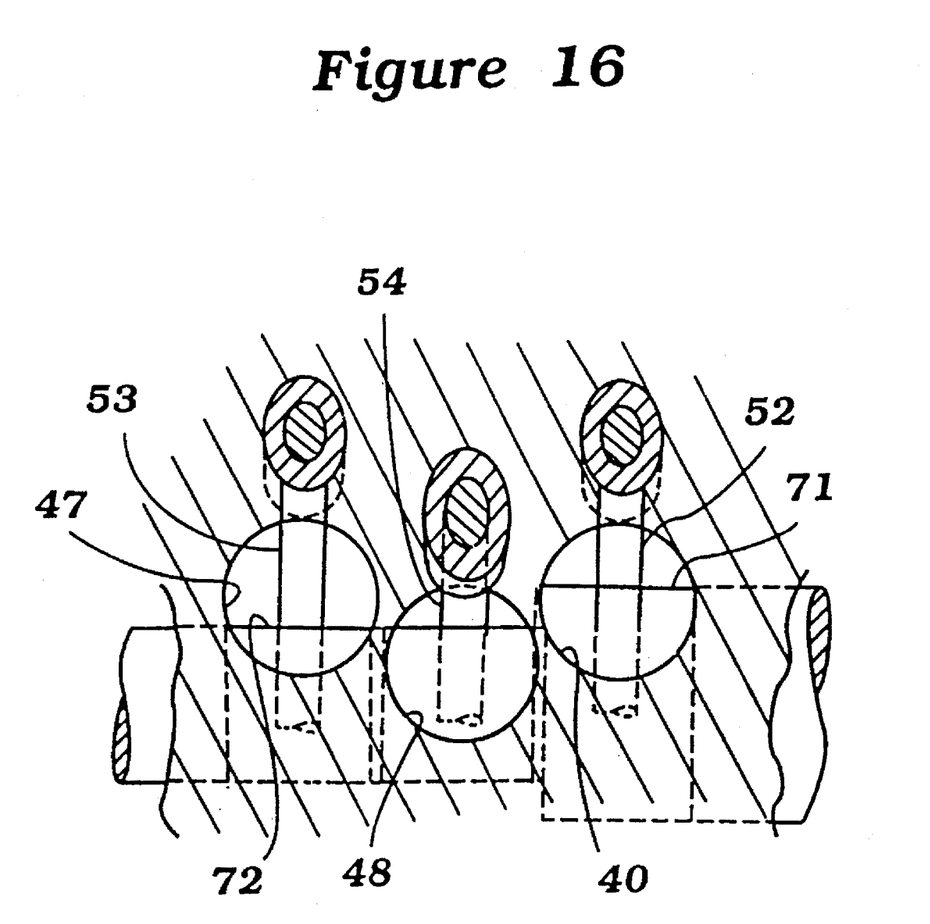
FIG. 16 is a cross-sectional view, in part similar to FIG. 6 and shows a still further embodiment of the invention.

In all of the embodiments thus far described, the construction has been employed in conjunction with engines employing five intake valves and having slant tumble generated from opposite sides of the cylinder bore and in opposite slant directions. Of course, the invention can be employed with two valve engines so as to achieve a slant flow in only one direction. There also may be some instances wherein it is desired to provide slant flow in only one direction even with a five valve engine and FIG. 16 shows such an embodiment. The only difference in this embodiment is that the cutouts 71, 72,and 73 are staggered so that the tumble action will be greatest from one of the side intake valve seats such as the side 42, next highest from the center intake valve seat 44 and lowest from the remaining side intake valve seat 43. Of course, the opposite slant action can be achieved.

It should be readily apparent from the foregoing description that the described embodiments of the invention are extremely effective in providing the desired degree of turbulence and slant tumble in the cylinder under low-speed and mid-range performance without restricting breathing capability at high-speed, high-load conditions. Of course, the foregoing description is that of preferred embodiments of the invention and various changes and modifications may be made without departing from the spirit and scope of the invention, as defined by the appended claims.

What is claimed is:

1. An induction system for an internal combustion engine comprising a cylinder block having a cylinder bore, a piston reciprocating in said cylinder bore, a cylinder head affixed to said cylinder block in closing said cylinder bore to define with said piston and said cylinder bore a combustion chamber, at least three intake valve seats formed in said cylinder head and forming three intake ports serving said combustion chamber, poppet valves associated with said intake valve seats and supported for reciprocation by said cylinder head for opening and closing said intake ports, induction passage means terminating at said intake ports for supplying an induction charge to said combustion chamber, said intake valve seats and said induction passage means being configured so as to direct the charge entering said combustion chamber in a generally axial direction and being substantially unrestricted, and a single control valve means supported into said cylinder head and movable in said induction passage means between a first position wherein the flow into the combustion chamber is substantially unrestricted and a second position wherein the flow into said combustion chamber is redirected to generated a tumble action within the combustion chamber.

2. The induction system of claim 1, wherein the induction passage means forms three separate induction passages each serving one of the intake valve seats.

3. The induction system of claim 2, wherein the common control valve means passes through the separate induction passages.

4. The induction system of claim 1, wherein the intake valve seats are disposed so that two of the intake valve seats are disposed closer to a plane containing the cylinder bore axis and forming side intake valve ports and the remaining intake valve seat is positioned further from said plane and forms a center intake port with the side intake ports being disposed on opposite sides of the center intake port.

5. The induction system of claim 4, wherein the plane contains the axis of rotation of the output shaft of the engine.

6. The induction system of claim 5, wherein the poppet valves associated with the side intake ports reciprocate about respective parallel axis that lie in a common plane disposed at an acute angle to the first mentioned plane and wherein the poppet valve associated with the center intake port reciprocates about a plane disposed at a lesser acute angle to the first mentioned plane than the plane defined by the axis of the side intake valves.

7. The induction system of claim 6, wherein the control valve means comprises a rotary valve element passing through the intake passage means serving each of the valve seats.

* * * * *